Figure 1:
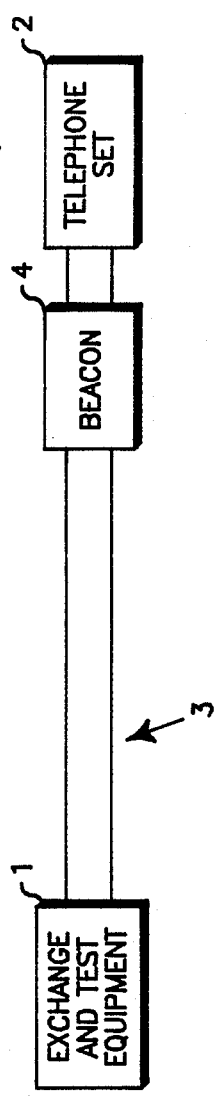

United States Patent [19]

Hing

[11] Patent Number: 4,754,472
[45] Date of Patent: Jun. 28, 1988

[54] TELECOMMUNICATION SYSTEMS

[75] Inventor: Sam A. Hing, Gland, Switzerland

[73] Assignee: Motorola, Inc., Schaumburg, Ill.

[21] Appl. No.: 854,265

[22] Filed: Apr. 21, 1986

[30] Foreign Application Priority Data

May 14, 1985 [GB] United Kingdom ............... 8512191

[51] Int. Cl.[4] .............................................. H04B 3/46
[52] U.S. Cl. ..................................................... 379/26
[58] Field of Search ....................... 379/22, 24, 26, 29, 379/30, 27, 4, 5, 6,

[56] References Cited

U.S. PATENT DOCUMENTS

| 3,663,769 | 5/1972 | Boatwrigh et al. | 379/22 |
| 3,890,495 | 6/1975 | Bauer et al. | 379/22 |
| 4,086,448 | 4/1978 | Anglikowski | 379/6 |
| 4,207,431 | 6/1980 | McVoy | 379/22 |
| 4,446,340 | 5/1984 | Fryer | 379/27 |
| 4,459,437 | 7/1984 | Gabry et al. | 379/27 |
| 4,528,427 | 7/1985 | Gadonna et al. | 379/26 |
| 4,550,225 | 10/1985 | Lynch et al. | 379/8 |

Primary Examiner—Stafford D. Schreyer
Attorney, Agent, or Firm—Michael D. Bingham

[57] ABSTRACT

A telecommunication system of the kind having a telephone handset connected to an exchange via a line incorporates a beacon (22) in the line for receiving a question signal from test equipment associated with the exchange and for sending an answer signal to the test equipment. The beacon (22) senses voltages in the two wires making up the line but is otherwise isolated from the line via a diode bridge (20) and a protection circuit (21) and high value resistor $R_p$. Previously known beacons were connected directly into the line to sense current and thus could not be protected by high value resistors.

12 Claims, 4 Drawing Sheets

TELECOMMUNICATION SYSTEMS

This invention relates to telecommunication systems of the kind having a main centre at a first location and a subsidiary user at a second location remote from the first location and connected thereto by a line. By main centre is meant a main node of a telecommunication network which may for example, in telephone systems, comprise a main telephone exchange or a local exchange or even a PABX. The subsidiary user may then be a telephone handset or a local exchange or even, in some circumstances, another main exchange.

More particularly, the invention relates to such systems having means for locating the position of faults in the system.

One such system is described in French Pat. No. 2 511 511 (U.S. Pat. No. 4,528,427, issued July 9, 1985) where a beacon is provided in the line between the first and second locations. When a fault is detected in the system, a question signal is sent from the main centre to the beacon. If the beacon returns an answer signal, then the main centre knows that the fault is located beyond the beacon either in the line or in the subsidiary user whereas if no signal is received from the beacon then the fault is located in the line between the main centre and the beacon.

The beacon in the above system is connected to the line which is a two-wire line and includes means connected directly in series with each wire for detecting current in one or other of the wires. This means that the beacon needs to be protected against overvoltage in the line, for example due to atmospheric conditions such as lighting or industrial conditions such as induction due to power lines. Such protection needs to have a high performance and should protect the beacon from both directions in the line.

It is thus an object of the present invention to provide a system where the beacon requires less stringent protection from overvoltage than hitherto.

According to a first aspect, therefore, the invention provides a telecommunication system comprising a main centre at a first location, a subsidiary user at a second location remote from the first location and connected thereto by a two wire line, and a beacon connected to the line between the main centre and the subsidiary user in parallel with the two wires via high value resistors, wherein the beacon directly compares the voltages in the wires forming the line to detect both an open and a short circuit in the two-wire line.

The beacon is preferably supplied with power from the line via a diode bridge with a protection circuit between the beacon and the diode bridge. This means that the protection circuit only needs to protect the beacon from ovevoltages in the power line from the diode bridge and the power line may therefore include a high value resistor. Such a large value resistor could not of course be inserted in the two-wire line to protect the beacon in the system described in French Pat. No. 2 511 511 since this would attenuate the signals in the two-wire line. Further high value resistors may be included between the beacon and the connections to the wires for comparing the voltages in the wires. Such resistors are used to minimise the current passing to the beacon directly from the two-wire line.

The main centre preferably incorporates test equipment which sends a question signal to the beacon when a fault has been detected in the system, and which determines whether an answer signal is received from the beacon.

According to a second aspect of the invention, there is provided a beacon for use in fault locating in a telecommunication system, the beacon comprising comparator means for comparing the voltages in two wires making up a line in the telecommunication system, a receiver for receiving a question signal via the line from test equipment located at a remote location from the beacon and an emitter for sending an answer signal via the line to the test equipment, the comparator means providing a first logic signal indicating a large difference in the voltages in the two wires and a second logic signal indicating substantially no difference in the voltages, the logic signals being used to activate the receiver and the emitter.

In a preferred embodiment the comparator means comprises a differential amplifier the inputs of which are the voltages from the two wires forming the line and whose output is passed both to a voltage detector which produces the first logic signal if the amplifier output is relatively high, and to a rectifier and low pass filter the output of which is passed to a zero-crossing detector which produces the second logic signal if the amplifier output is substantially zero.

Figure 2:
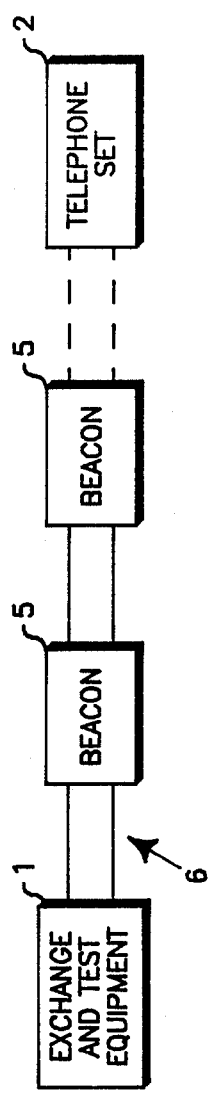
Figure 3:
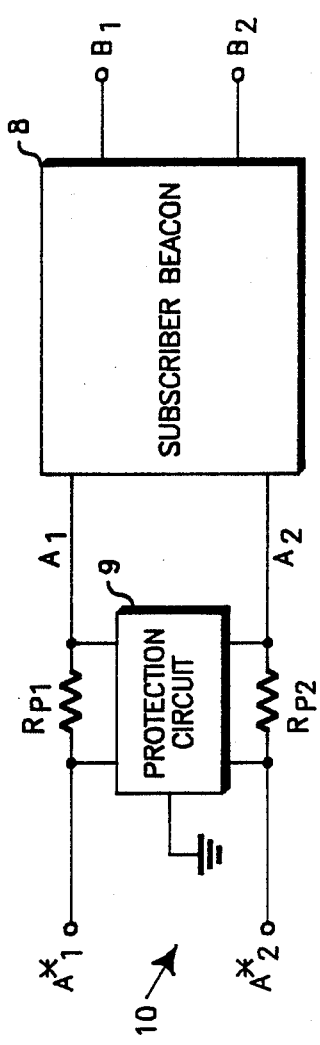
Figure 4:
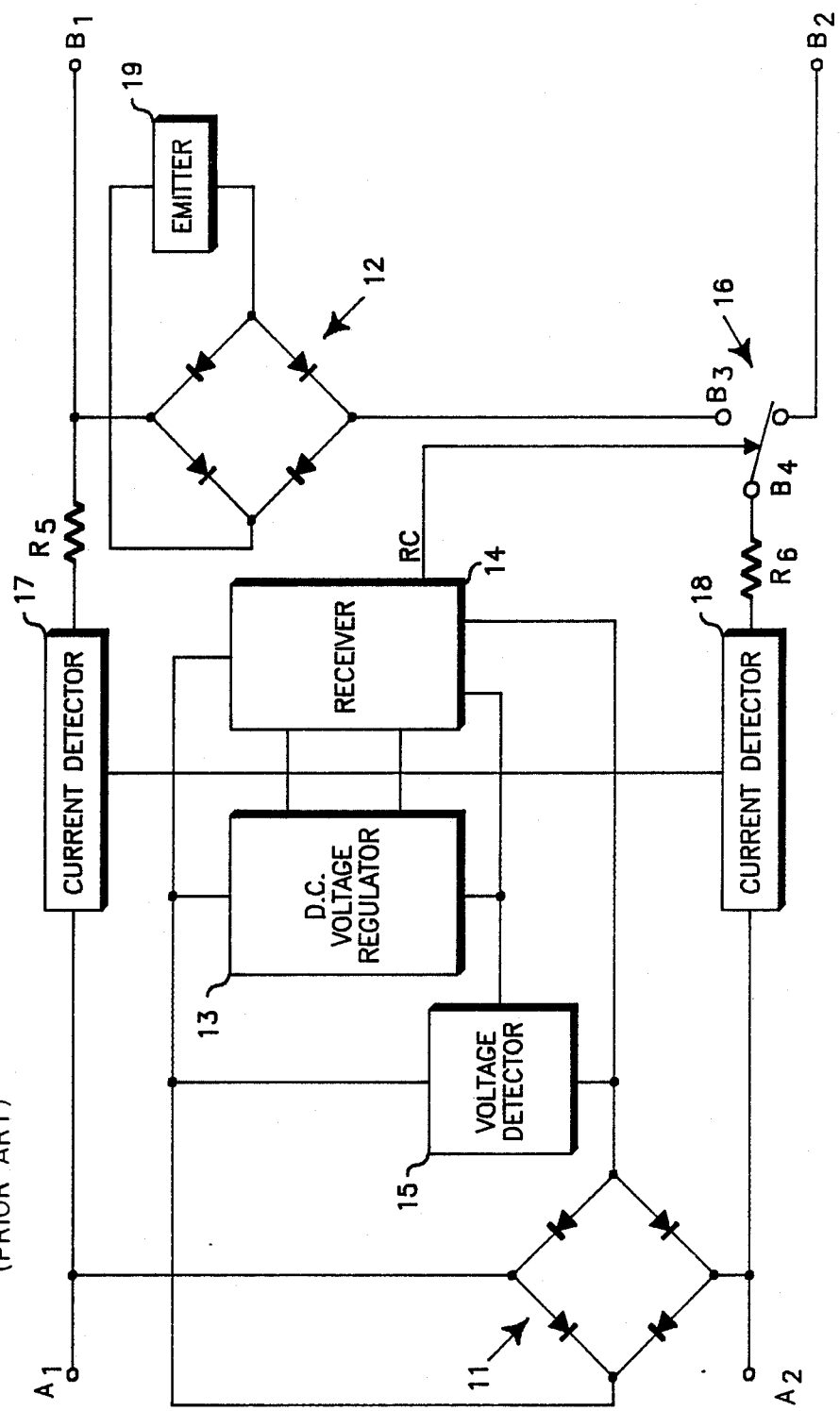
Figure 5:
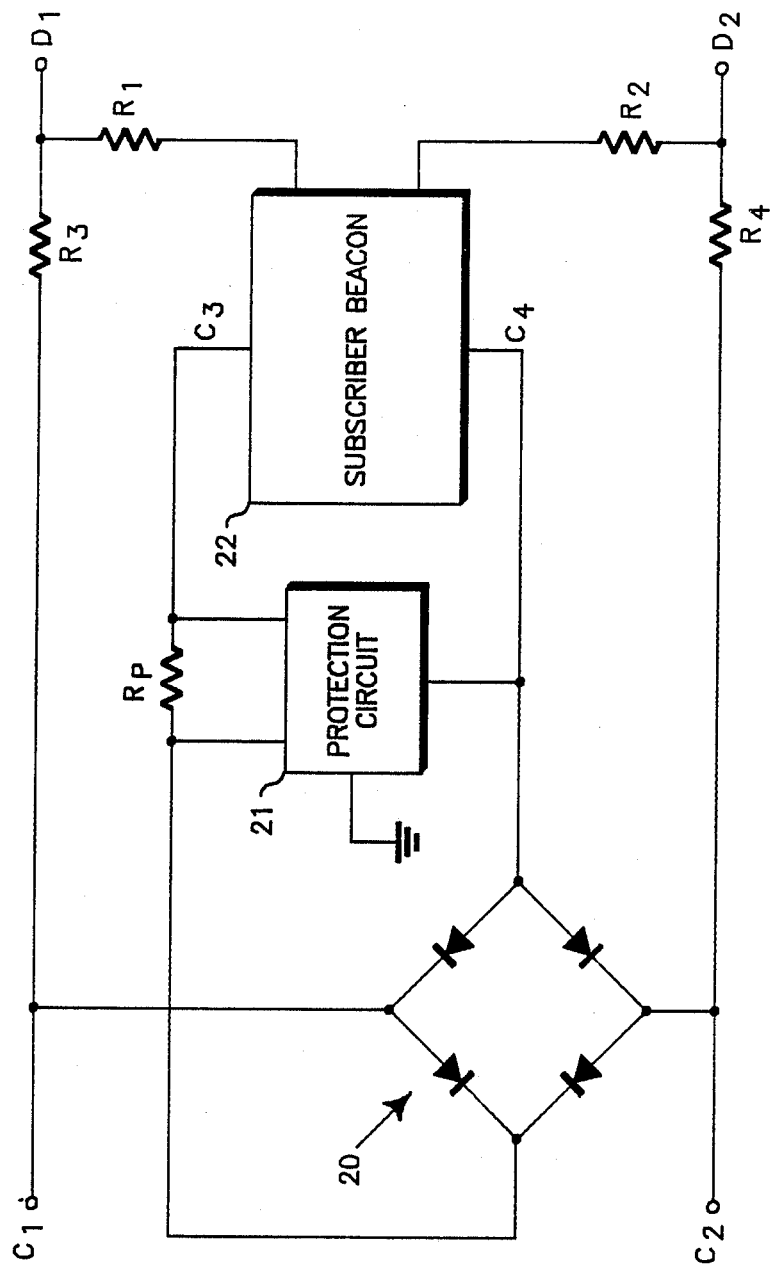
Figure 6:
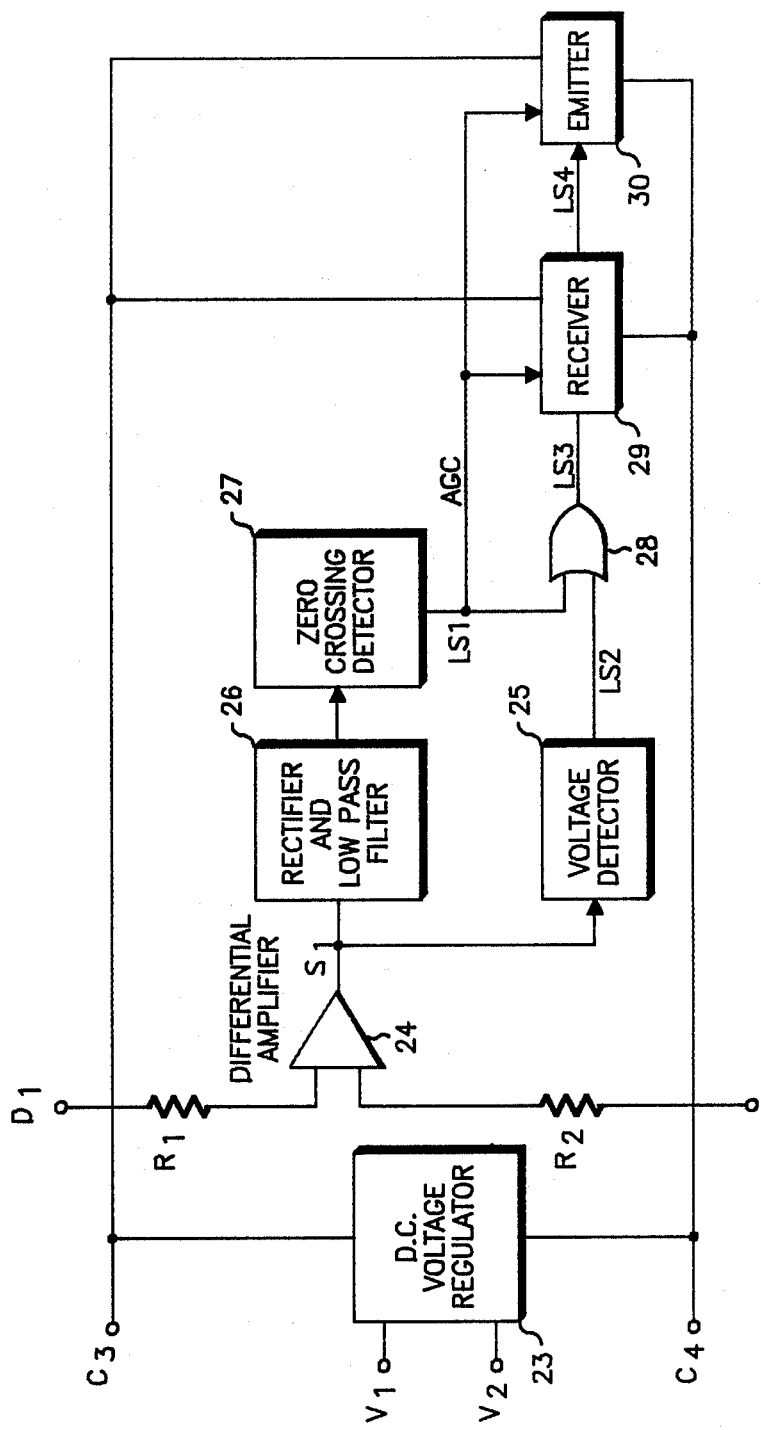

The invention will now be more fully described, by way of example, with reference to the drawings of which:

FIG. 1 diagramatically shows one configuration of part of a telecommunication system incorporating a beacon;

FIG. 2 diagramatically shows a second configuration of part of a telecommunication system incorporating a beacon;

FIG. 3 schematically shows a known method of connecting a beacon to a line;

FIG. 4 shows in more detail the structure of the beacon of FIG. 3;

FIG. 5 schematically shows a method of connecting a beacon according to the invention to a line; and FIG. 6 shows in more detail the structure of the beacon of FIG. 5.

There is shown in FIG. 1 part of a telephone system having an exchange 1 and a telephone set 2 connected to the exchange 1 by a two-wire subscriber line 3. A beacon 4 is connected to the line 3 near to the telephone set 2. If a fault is detected in the system, then test equipment associated with the exchange 1 sends a signal down the line 3 to the beacon 4. If the beacon 4 replies, then it is clear that the fault lies in the telephone set 2 whereas if no answer is received from the beacon 4, the fault must lie in the line 3.

If the line is fairly long, as shown in FIG. 2, then a number of further beacons 5 can be inserted in the line 6 at intervals along its length. Depending on which is the furthest beacon to reply, the fault is thereby localised as being beyond that beacon.

In French Pat. No. 2 511 511 the question signal from the test equipment is coded by one frequency and the answer signal from the beacon is coded by a different frequency. The beacon described in this patent is connected to the line as shown in FIG. 3.

The subscriber beacon 8 is provided with four ports $A_1$, $A_2$, $B_1$ and $B_2$. The ports $A_1$ and $A_2$ are connected, via a protection circuit 9 to the subscriber line 10 as at $A_1^*$ and $A_2^*$. Ports $B_1$ and $B_2$ are then connected to the telephone set (not shown) in a similar manner to that of FIG. 1. The protection circuit 9 consists of active and passive components connected to the line via two resistors $R_{p1}$ and $R_{p2}$ which are required to be of fairly small value in order to preserve normal performance of the telephone network. High values of these resistors would decrease the connection length and attenuate speech transmission. Since $R_{p1}$ and $R_{p2}$ are required to have a small value, the protection circuit 9 must be of high performance.

The beacon 8 is shown in more detail in FIG. 4 and comprises two diode bridges 11 and 12 to provide power independent of line polarity to the other parts of the beacon. The bridge 11 supplies a voltage detector 15, a D.C. voltage regulator 13 and a receiver 14 and the bridge 12 supplies an emitter 19 when a relay 16 is switched due to a signal from the receiver 14, as will be further described below. The beacon also comprises two current detectors 17 and 18 and two resitors $R_5$ and $R_6$.

As mentioned above, the beacon is only required to operate when there is a fault in the system and this will involve either a short circuit or an open circuit across ports $B_1$ and $B_2$.

If a short-circuit occurs in the telephone set, a d.c. current is detected by either current detector 17 or 18, depending on line polarity, which then switches on the d.c. voltage regulator 13. The resistors $R_5$ and $R_6$ are used in this case to provide a d.c. voltage feeding the beacon electronic circuits. The d.c. regulator 13 then supplies the receiver 14 with constant voltages which becomes operational to receive a question signal of a particular frequency sent from the test equipment via the line 10 and the diode bridge 11. The receiver includes an a.c./d.c. converter which transforms the a.c. signal into a relay control logic signal RC which activates the relay 16 to switch from its normal position connecting $B_2$ to $B_4$, as shown in FIG. 4, to connect $B_4$ to $B_3$ so that emitter 19 is switched on, via the diode bridge 12, and generates an answer signal with a frequency different from that of the question signal.

If $B_1$ or $B_2$ is disconnected from the telephone set, the circuit is said to be open. In this case no d.c. current flows in the loop and the current detectors are inactive. However, the d.c. voltage regulator 13 can still be switched on by the voltage detector 15 which is activated by a transient signal sent by the test equipment. This transient signal consists of an abrupt switching of battery voltage from zero to a nominal value (typically −48 v). Of course, the d.c. regulator 13 is, in this case, only operational for a short time, but this is enough to allow the question signal to be received and the relay to be switched to allow the emitter to reply, as previously described.

One of the problems of the above beacon, as mentioned above, is that it needs to be protected against overvoltage in the line. However since the beacon is connected directly in the line, large value resistors cannot be used and the protection circuit must be of very high quality. In any case, by limiting the voltage in the line, unacceptable harmonic distortions to the ringing signal can occur. Further disadvantages of the above described beacon are that two diode bridges are required and that a relay, which is relatively expensive, is used.

FIG. 5, shows the way in which a beacon according to the invention is connected to a line. In this case, the subscriber line is connected to $C_1$ and $C_2$ and the telephone handset is connected to $D_1$ and $D_2$. A diode bridge 20 is used to provide single polarity power via a protection circuit 21 to ports $C_3$ and $C_4$ of a beacon 22. As can be seen, the beacon and the protection circuit are not connected directly into the line so that the protection resistor $R_p$ can be made fairly high (e.g. ten times the value of $R_{p1}$ or $R_{p2}$). Resistors $R_3$ and $R_4$, which are in the line to provide a d.c. voltage between $C_1$ and $C_2$ in the event of a short-circuit between $D_1$ and $D_2$, have a small value so that attenuation does not occur. The beacon 22 senses the voltage on each of the wires making up the line from ports $D_1$ and $D_2$ via resistors $R_1$ and $R_2$ which are of high value (several megaohms each) and thus minimise current consumptions.

The structure and operation of the beacon 22 will now be more fully described with reference to FIG. 6. Thus, the beacon 22 comprises a d.c. voltage regulator 23 which is connected across ports $C_3$ and $C_4$ and supplies the other electronic circuits in the beacon with constant voltage via ports $V_1$ and $V_2$. As mentioned above, the beacon compares the voltages on the wires making up the line via resistors $R_1$ and $R_2$ using a differential amplifier 24 which produces a difference signal $S_1$ indicating the difference in these voltages. This signal $S_1$ is passed to a voltage detector 25, which measures the difference and produces a logic signal $LS_2$ if the difference is large. The signal $S_1$ is also passed to a rectifier and low pass filter 26 which rectifies the signal $S_1$ to be independent of line polarity and filters it so that the beacon is insensitive to normal signals in the line such as the ringing signal, dialing impulses, speech, etc. The output of this low-pass filter 26 is a d.c. signal which becomes a logic signal $LS_1$, via a zero-crossing detector 27 which produces a high logic signal if its input is substantially zero and a low logic signal otherwise. The two logic signals $LS_1$ and $LS_2$ are passed to an OR-gate 28 which produces a third logic signal $LS_3$ if either $LS_1$ or $LS_2$ are high and this third logic signal $LS_3$ switches on a receiver 29 which is activated to receive a question signal from test equipment via the line. This question signal is then converted to a logic $LS_4$ which is used to switch on the emitter 30 which sends an answer signal to the test equipment via the subscriber line. Emitter 30 may be, for example, a frequency generator similar to emitter 19 of FIG. 4. Normally both the receiver 29 and the emitter 30 are switched off to save current consumptions.

When a short-circuit occurs in the telephone set, the voltages in the two wires are equal, the difference signal $S_1$ therefore being zero. This causes the zero crossing detector 27 to produce a high logic signal $LS_1$ and the OR Gate 28 consequently produces a high logic signal $LS_3$ which switches on the receiver 29. The receiver then receives a question signal from the test equipment, as described above, and causes the emitter to send an answer signal.

If an open circuit occurs across $D_1$ and $D_2$ then the voltages in the two wires are different and $LS_1$ is zero. However, since $R_1$ and $R_2$ are very much higher than $R_3$ and $R_4$ the voltage inputs to the differential amplifier 24 are approximately equal to line voltage so that a transient signal sent from the test equipment can be detected by the voltage detector 25. This then provides a high logic signal $LS_2$ which activates the receiver 29, as before.

Clearly, if the telephone set is short-circuited, signals in the line can lead to large amplitude variations of the voltages being passed to the receiver and emitter. Consequently, the receiver and emitter gains are set to allow the most advantageous reception and emission conditions for an open circuit. These gains are then automatically increased to reach the same conditions by using the logic signal $LS_1$ as an automatic gain control (AGC) as shown in FIG. 6.

The invention therefore has advantages over the known beacon in that only one protection resistor $R_p$ is required and this can be of a high value so that the protection circuit requirements are less stringent than previously. Another advantage is that only one protection circuit is required even if the beacon is connected as shown in FIG. 2. Furthermore, the relay used in the prior art is not now required.

It will be apparent that the beacon according to the invention can be used in any telecommunication system where two parts of the system are connected by a line so as to help localise any faults in the system and its use is not limited to a subscriber line as described above.

I claim:

1. A telecommunication system comprising a main center at a first location, a subsidiary user at a second location remote from the first location and connected thereto by a two-wire line, and beacon means connected to the line between the main center and the subsidiary user in parallel with the two wires via high value resistors for directly comparing voltages in the wires forming the line to detect both an open and a short circuit in the two-wire line.

2. A telecommunication system according to claim 1 wherein the beacon means is supplied with power from the line via a diode bridge, the system including an overvoltage protection circuit between the diode bridge and the beacon means.

3. A telecommunication system according to claim 2 wherein the beacon means is supplied with power from the diode bridge via a high value resistor and the protection circuit is responsive to the voltage across the high value resistor.

4. A telecommunication system according to claim 1 wherein the main center incorporates test equipment for sending a question signal to the beacon means and for receiving an answer signal from the beacon means.

5. A telecommunication system according to claim 1 wherein said main centre is a telephone exchange and the subsidiary user is a telephone handset.

6. A beacon for use in a telecommunication system, including a two-wire line, the beacon comprising comparator means for comparing voltages in the two wires making up the line, a receiver for receiving a question signal via the line from test equipment located at a remote location from the beacon and an emitter for sending an answer signal via the line to test the equipment, the comparator means providing first and second output signals indicative of open and short circuit conditions respectively in the two wires, and means responsive to the first and second output signals for activating the receiver and the emitter.

7. A beacon according to claim 6 wherein the means for activating the receiver includes a voltage detector which produces a first logic signal in response to the first output signal.

8. A beacon according to claim 7 wherein the means for activating the receiver includes a rectifier and low pass filter whose output is passed to a zero-crossing detector which produces a second logic signal in response to the second output signal.

9. A beacon according to claim 8 wherein said first and second logic signals are passed to gating means which produces a third logic signal dependent on the state of said first and second logic signals which is used to switch on the receiver.

10. A beacon according to claim 9 wherein said receiver produces a fourth logic signal which is used to switch on the emitter.

11. A beacon according to claim 8 wherein said second logic signal is used as an Automatic Gain Control signal to adjust the gain of both the receiver and the emitter.

12. A beacon according to claim 6 wherein said comparator means comprises a differential amplifier, the inputs of which are the voltages from the two wires forming the line.

* * * * *